D. T. DAY.
EXTRACTION OF HYDROCARBON PRODUCTS FROM SHALE AND COAL.
APPLICATION FILED SEPT. 28, 1917.
1,280,178.
Patented Oct. 1, 1918.
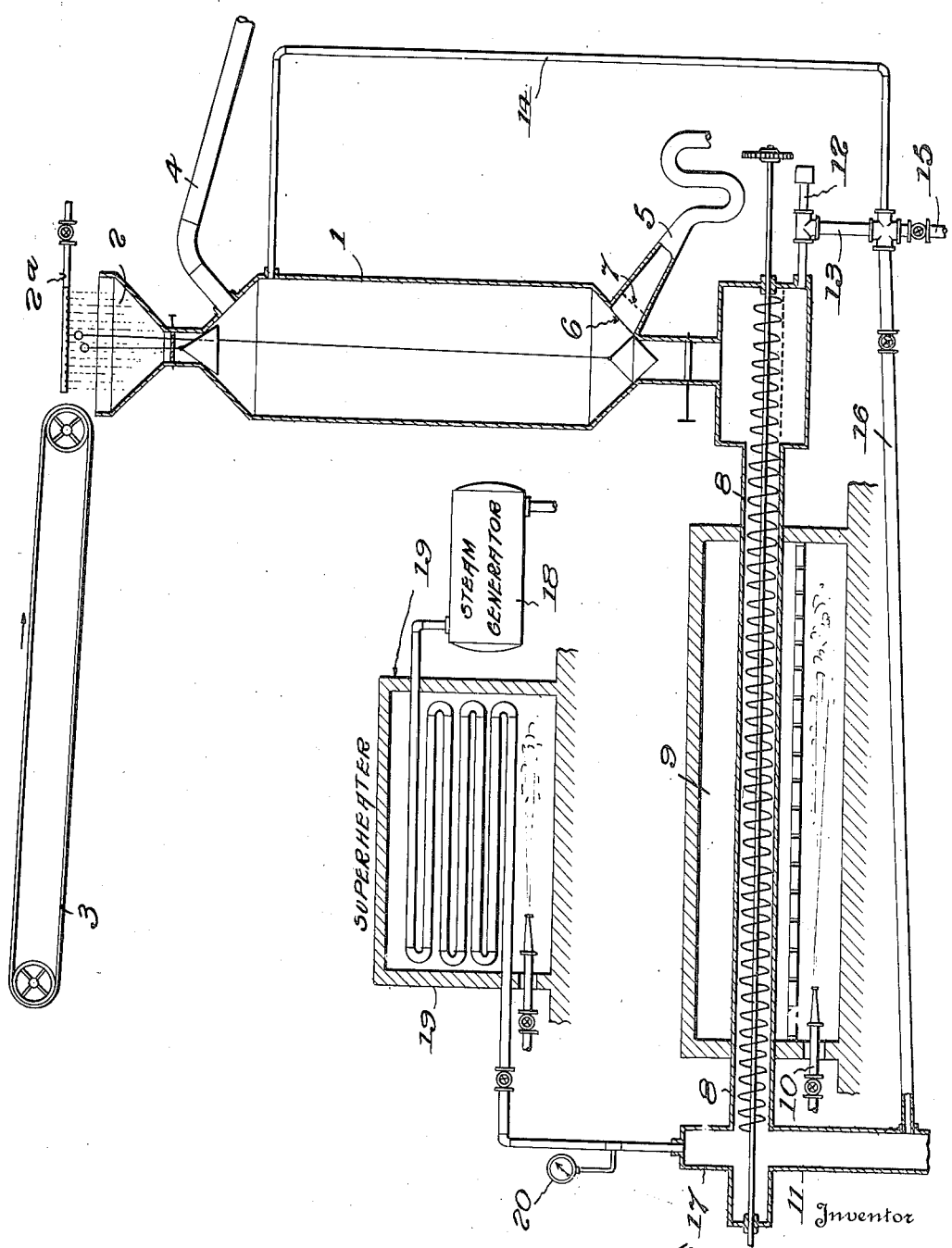
Inventor
DAVID T. DAY,
By Spencer B. Prater,
Attorney

UNITED STATES PATENT OFFICE.

DAVID T. DAY, OF WASHINGTON, DISTRICT OF COLUMBIA, ASSIGNOR TO VERNER Z. REED, OF DENVER, COLORADO.

EXTRACTION OF HYDROCARBON PRODUCTS FROM SHALES AND COAL.

1,280,178.      Specification of Letters Patent.      Patented Oct. 1, 1918.

Application filed September 28, 1917. Serial No. 193,743.

*To all whom it may concern:*

Be it known that I, DAVID T. DAY, a citizen of the United States, residing at Washington, in the District of Columbia, have invented new and useful Improvements in the Extraction of Hydrocarbon Products from Shales and Coals, of which the following is a specification.

This invention relates to improvements in the extraction of hydrocarbon products, nitrogen bases, oils and the like from shales and coals.

One feature of the invention relates to the combined extraction of material by solvent action and destructive distillation, the process being conducted in the presence of an acid added or obtained by distillation.

A further feature of the invention includes the use of vapors derived from the shale as a novel solvent for the volatile matter present in such shale or coal.

In the ordinary process of obtaining oils and other hydrocarbon products, nitrogen bases, and the like, from shales, and in some cases from coals, it is customary to heat these shales in stills without access of air. Usually vertical stills are employed, the shale being introduced at the top, and after its introduction, the top is closed with a ball hopper or other device. Heat is applied around this still so that it is hotter at the bottom and the vapors are driven off through an exit pipe somewhere near the top. Frequently steam is introduced near the bottom of the still for the purpose of breaking up highly resilient compounds, and especially in increasing the formation of ammonia as a valuable by-product. In other cases, screw or endless chain conveyers are used for carrying the shale through hot tubes, the vapors being taken off at the upper or lower end of the heated tube. In each instance the profit in operating such a still increases with the amount of volatile material which can be driven off from the shale, and on the other hand the profit ceases when the shales yield such a small proportion of oils, and the like, that they yield less in value than the combined comparatively high cost of heating the body of shale and cost of furnishing heat for the evaporation of the volatile matter. The heat required is greater than in the distillation of oils, for beside the quantity consumed in the distillation of already existing oil in the shale is that heat needed for the high temperature required for the destructive distillation of the organic matter in the shale.

It is well known that many shales contain considerable oil already existing as oil, which is shown by the fact that this can be extracted by suitable solvents such as ether, benzol and other light aromatic oils, gasolene, phenol, etc. In some cases I have obtained as much as three fifths of the oil obtainable by distillation, by simple extraction with a hot solvent. A process, however, based merely on extraction by solvents would be costly, and would also leave valuable volatile products still present in the shale, especially nitrogen bases and other compounds obtainable by destructive distillation. It is the aim, therefore, of the present process, to combine extraction by solvents with destructive distillation with the effect of recovering as great a percentage as possible of the volatile matter by the action of solvents at a low temperature and leave as little work as possible to be effected by destructive distillation at high temperatures, and therefore at high cost.

In this process a certain amount of the shale is first introduced from the extraction chamber described hereafter into an inclined, tubular retort, which is then subjected to the temperature necessary to drive out all of the volatile matter. This volatile matter is then delivered in the form of vapor, or vapor and liquid, into an extraction chamber containing the shale to be heated. These vapors condense to a certain extent in the chamber of cold shale and the hot condensed liquids exert the maximum solvent action possible and thereby take out of the shale a large proportion of the contained volatile materials. Some of the vapor in passing through the shale will enter the pores of the shale and combine with the oil therein rendering this oil thinner and give it a tendency to flow out of the shale. The resulting liquid is drawn off at the bottom of this chamber and the shale, thus partially deprived of its volatile matter and liquid, is delivered through the bottom of the shale-holding chamber on to a screw or other conveyer by which it is delivered into the first mentioned hot tube or retort where the remaining volatile matter is extracted by destructive distillation. The resulting vapors are continually delivered into the shale or tank and continually exert their solvent action on new portions of shale fed into this container. As a result, the necessary amount of expensive work of destructive distillation is reduced in proportion to the percentage of the soluble constituent taken from the shale.

This process presents the use of the vapors from the shale itself as a new solvent for the volatile matter in such shale. It has been found that much of the hydrocarbon material present in shales is adsorbed to the surface of the shale particles and permeates the shale in such a way as to be insoluble until acted upon by acid or basic substances such as phenol, pyroligenous acids, pyridins, and acid or basic substances, when the volatile matter becomes soluble in benzol or other aromatic hydrocarbons or gasolene containing phenols. The present process eliminates much expensive treatment by providing for the use of said solvents found directly in the condensed vapors from the shale itself. The invention also provides the use of acids, including mineral acids, as solvents, without regard to their origin, and the invention is not limited to their formation by distillation from the shale.

In the operation of the invention, the process may be carried out by means of the apparatus illustrated in the accompanying drawing in which 1 indicates an extraction chamber in which fresh cold shale is subjected to the solvent action of vapors as will be further described. Located above the chamber 1 is a receiving hopper 2 arranged to receive material such as shale or coal brought thereto by means of suitable conveyer apparatus indicated by 3. It is advantageous to crush the ore, shale or coal, and allow it to dry as much as possible before treating it with solvents. While the shale or other similar material is on the conveyer or in the receiving hopper 2, or while it is in the chamber 1, it receives from the pipe 2ª a very fine spray of acidulated water or dilute acid, either hydrochloric or sulfuric acid, or any other acid which is easily obtained. The results require acidity and the type of acid is not of importance. By the use of the acid I have found that I may overcome the adsorptive force by which the particles of oil cling to the surface in the pores of the shale, and that this adsorptive bond is broken up by acids. There is no new discovery about the existence of the adsorptive power on the part of shales or other porous substances. The invention consists in the discovery that this bond is easily broken up by a dilute acid in which apparently the acid is not used up to any perceptible extent, and does not enter into chemical combination with the oil. At the same time that this fine spray of acidulated water is used on the shale at the top of the apparatus, there also enters at or near the top of the chamber 1 the vapor from the distilling retort, as will be presently described, this vapor consisting principally of hydrocarbons just described and having comparatively low boiling point and great capacity as solvents. It should be noted that in addition to the hydrocarbons which go into the chamber 1 in the form of vapor, there is also present various organic acids, such as acetic acid, which give assistance in the breaking of the adsorptive bond between the oil and the shale, and thus render less important the addition of supplemental acid applications. Closures are provided at the top and bottom of the chamber 1 for limiting the passage of shale into and out of a chamber and also for preventing the escape of the solvent vapors from the chamber while the shale is being treated. Located adjacent the top of the chamber 1 is a conduit 4 leading off from the chamber and designed to provide a passageway for the discharge of gases to a condenser and scrubber, not shown. Adjacent the base of the chamber 1 there is a conduit for conducting the extracted liquids and condensed vapors to a suitable tank for storage. This conduit is indicated by the numeral 5. At the junction of the conduit with the chamber 1 there is provided suitable means for preventing the discharge of the shale material into the conduit as indicated by a slotted screen 6 and a wire screen of woven material 7. The conduit 5 is provided with a gooseneck bend to provide a trap and seal as is the general practice in such apparatus. At the base of the retort 1 provision is made for the discharge of the shale into the inclined tubular retort 8 which is provided with a screw conveyer arranged to carry material through the same. This tubular retort 8 is provided with a heating device or furnace as indicated by 9 which makes it possible to effect the destructive distillation of material conveyed through the tube 8. The furnace 9 may obtain its source of fuel by any means as is shown at 10 as an oil or gas heater. At the end of the tube 8 farthermost from the chamber 1 is a discharge passage for the spent shale indicated by 11. At the opposite end from the discharge passage 11 and somewhat nearer the chamber 1, the tube 8 is provided with a discharge passage 12 for the vapors extracted from the shale in the tube 8. These vapors are carried from the tube 8, through the discharge passage 12 and into a passageway 13 from which they are conducted as vapors to the top of the chamber 1 by means of the conduit 14 as will be further described. Heavy matters such as tar which may be liberated in the tube 8 and passed through the discharge passage 12 and passageway 13 may be trapped adjacent the bottom of the member 13 and led to a receiving tank for tar as indicated by the passageway 15. An optional treatment is provided by the conduit 16 through which the heavy tars may be delivered for cracking by the hot spent shale discharged through the passage 11. Connected to the system as indicated at 17 is an inlet passage for superheated steam for use if it be desirable to use steam in the extraction process. A steam generator is shown diagrammatically at 18, a superheater therefor at 19 and a pressure gage at 20.

In the operation of the process and the apparatus an amount of shale is introduced from the chamber 1 into the tubular retort 8 where it is subjected to a temperautre necessary to drive out all volatile matter, this being effected by the heat of the furnace 9. The volatile matter is then delivered in the form of a vapor or a vapor and liquid through the passageways 12, 13 and 14, into the chamber 1 containing the cold shale to be treated. The hot vapors condense to a certain extent in the chamber of cold shale and the hot condensed liquids exert the maximum solvent action possible and thereby take out of the shale a large proportion of the volatile materials contained therein. The resulting extracted liquid containing the material previously adsorbed to the shale particles is drawn off from the chamber 1 by the conduit 5. The shale which has been deprived of its volatile matter is delivered from the chamber 1 into the tube 8 and conveyed by means of the screw conveyer into that portion of the tube heated by the furnace 9. Here the remaining volatile matter is extracted by destructive distillation and the resulting vapors containing phenols, pyridins and acids are continually delivered through the passageways 12, 13 and 14 into the top of the chamber 1 as previously described where these vapors exercise their solvent action on new portions of the shale which may be led into the chamber 1.

The present application is a continuation in part of the application filed Dec. 1, 1916, now Patent No. 1,244,840, issued October 3, 1917.

From the foregoing it will be obvious that this process provides for the obtaining of oils and other hydrocarbon products by the use of acid or by the use of solvents in the presence of acid which would not otherwise be readily obtained from shales and coals.

What I claim is:

1. The process of extracting hydrocarbon oil matter from petroleum bearing shales and coals which comprises subjecting a mass of such shale or coal containing the desired hydrocarbon matter in a container to the solvent action of material to which an acid has been added, permitting the solvent material to pass through the mass of shale or coal, and recovering the combined solvent and extracted matter.

2. The process of extracting hydrocarbon oil matter from petroleum bearing shales and coals which comprises subjecting the material to be treated to the solvent action of a solvent medium to which an acid has been added to remove the hydrocarbon oil material from the shale and break down the adsorptive bond between the oil material and the shale, and separating the combined solvent medium and acid with the material dissolved thereby from the shale and coal.

3. The process of extracting hydrocarbon oil matter from petroleum bearing shales and coals which comprises subjecting a mass of such shale or coal containing the desired hydrocarbon matter in a container to the solvent action of material containing a mineral acid, permitting the solvent material to pass through the mass of shale or coal, and recovering the combined solvent and extracted matter.

4. The process of treating shales or coals to extract hydrocarbon material therefrom which comprises the extraction in one chamber of a material containing acids from said shale or coal by the destructive distillation of a portion of semi-spent shale or coal, the application in a second chamber of the hot extracted material to a mass of substantially untreated shale whereby said hot extracted material containing acids dissolves hydrocarbon matter from said shale, and the recovery of the combined solvent and extracted matter in liquid form from said mass of semi-spent shale or coal.

5. The continuous process of treating shales or coals to extract hydrocarbon material therefrom which comprises first the extraction in one chamber of vapor containing acids from said shale or coal by the destructive distillation of a portion of semi-spent shale or coal, the application in a second chamber of the hot extracted material to a mass of substantially untreated material whereby said hot extracted material containing acids condenses and dissolves hydrocarbon matter from said untreated material, the recovery of the combined condensed solvent and extracted matter in liquid form from said mass of untreated material which thereby becomes semi-spent material, and the subsequent primary treatment of said semi-spent material to obtain vapors therefrom by destructive distillation in said first chamber.

6. A process of extracting hydrocarbon oil matter from petroleum bearing shales and coals which comprises subjecting a mass of such shale or coal containing the desired hydrocarbon matter in a container to the solvent action of material containing an acid taken from said shales and coals, permitting the solvent matter to pass downwardly through the mass of shale or coal, and recovering the combined solvent and extracted matter.

7. The process of extracting hydrocarbon matter from shales and coals which comprises subjecting a mass of such shale or coal containing the desired hydrocarbon matter in a container to the action of hot vaporous material containing acid, condensing said vaporous material in said shale or coal, permitting the condensed materials to pass downwardly through the mass of shale or coal and exercise a solvent action on the oil material therein, and recovering the combined solvent and extracted matter.

8. The process of treating shales or coals to extract hydrocarbon material therefrom which comprises the extraction in one chamber of solvent material from said shale or coal by the destructive distillation of a portion of semi-spent shale or coal, the application of a dilute acid to a mass of substantially untreated shale or coal, the application of said hot extracted material to said mass of shale or coal whereby said hot extracted material dissolves hydrocarbon matter from said shale, and the recovery of the combined solvent and extracted matter in liquid form from said mass of semi-spent shale or coal.

9. The process of treating shales or coals to extract hydrocarbon material therefrom which comprises the extraction in one chamber of solvent material from said shale or coal by the destructive distillation of a portion of semi-spent shale or coal in the presence of an acid solvent, the application in a second chamber of the hot extracted material to a mass of substantially untreated shale whereby said hot extracted material dissolves hydrocarbon matter from said shale, and the recovery of the combined solvent and extracted matter in liquid form from said mass of semi-spent shale or coal.

10. The continuous process of treating shales or coals to extract hydrocarbon material therefrom which comprises first the extraction in one chamber of a vapor from said shale or coal by the destructive distillation of a portion of semi-spent shale or coal, the application of a dilute acid solvent to a mass of substantially untreated shale to exercise a solvent action on hydrocarbon material present in the shale, the application in a second chamber of the hot extracted vaporous material to a mass of substantially untreated material whereby said hot extracted material condenses and dissolves hydrocarbon matter from said untreated material, the recovery of the combined condensed solvent and extracted matter in liquid form from said mass of untreated material which thereby becomes semi-spent material, and the subsequent primary treatment of said semi-spent material to obtain vapors therefrom by destructive distillation.

11. The continuous process of treating shales or coals to extract hydrocarbon material therefrom which comprises first the extraction in one chamber of a vapor from said shale or coal by the destructive distillation of a portion of semi-spent shale or coal, the application in a second chamber of the hot extracted vaporous material to a mass of substantially untreated material in the presence of an acid solvent whereby said hot extracted material condenses and dissolves hydrocarbon matter from said untreated material, the recovery of the combined condensed solvent and extracted matter in liquid form from said mass of untreated material which thereby becomes semi-spent material, and the subsequent primary treatment of said semi-spent material to obtain vapors therefrom by destructive distillation.

In testimony whereof I have hereunto set my hand.

DAVID T. DAY.